United States Patent Office 2,890,957
Patented June 16, 1959

2,890,957

PROCESS FOR PREPARING QUICK-COOKING RICE

Edward Seltzer, Teaneck, N.J., assignor to Thomas J. Lipton, Inc., Hoboken, N.J., a corporation of Delaware No Drawing. Application September 30, 1953
Serial No. 383,405

5 Claims. (Cl. 99—80)

This invention relates to processed starch-containing products such as rice and barley, and to methods of production thereof. More particularly this invention relates to "quick-cooking" rice, barley and the like, which can be prepared for the table in a relatively short period of time compared to that normally necessary for such raw milled grains, and, a method of manufacture thereof which conditions the product for easy and quick home preparation as a food item, either alone or when the product is part of a dry packaged mix, such as a mix for soup, Spanish rice, rice pudding, or the like.

The normally obtainable raw polished rice generally has dense, hard grains consisting largely of raw starch and having a moisture content ranging from 8% to 14%. Such rice usually requires at least twenty minutes to cook to a suitable palatability in boiling water, or in soup or the like. When cooked alone it is accepted practice to rinse, then boil the rice in an excess of water, then to drain off the cooking water in a sieve or the like, and to wash the rice with a relatively large amount of hot or cold water. Such cooking will generally produce a hydrated rice containing from 70% to 80% moisture depending upon the particular conditions of cooking. This procedure has generally been considered somewhat unsatisfactory by many because of the time and care necessary, and because of the relative difficulty in producing a final product which has uniformly high quality and attractiveness. Furthermore, some people contend that the long boiling in water, which tends to burst some of the grains, and the rinsing remove a substantial amount of the valuable constituents (other than starch), i.e., minerals, vitamins and natural sugars.

Various attempts have been made to factory-process rice to reduce the time necessary in the home preparation, resulting in the so-called "quick-cooking" rices. With the presently available "quick-cooking" rices it has been found that the home-reconstituted product may become extremely friable. Consequently products of this type must be spooned very gently when prepared in the kitchen to prevent excessive breakage which tends to produce an unattractive mass rather than the attractive individual grains generally considered desirable. In addition it has been found that such products are very sensitive to over-cooking, and when vigorously boiled in a water suspension such as in soups for more than the minimum period of time, the grains tend to split and break or fray at the ends so as to form a starchy mass. A further difficulty with quick-cooking rices of the types generally available for use in prepared mixes is that their moisture content range is too high, i.e., from 10% to 14% moisture. The reason for their unacceptability is that each of the ingredients in a dry packaged mix must not have more than a predetermined moisture content; otherwise, there may be a transfer of moisture from one ingredient to another which may then deteriorate when at the higher moisture content. Accordingly, if such rice is to be used in many packaged mixes, its moisture content must be reduced to about 5% to 6.5%. In the drying of certain other quick-cooking rices to a low moisture content, it has been found that the wholeness of the grains is affected so that the individual rice grains tend to disintegrate upon cooking. Some methods of processing rice as discussed above also result in substantial losses to the boiling and rinsing water because of the progressive disintegration of the grains and the leaching out and dissolving of constituents.

The preparation of some other starch-containing products such as barley for the table involves cooking processes consuming even greater periods of time than does rice. Raw pearl barley is customarily soaked for a long period of time, as much as 7 to 12 hours, depending upon the size of grain, and then boiled for a period of three-quarters of an hour to an hour; or, it is boiled for a longer period without prior soaking. If soaking is practiced, the soaking water must be discarded because it has objectionable flavorings and colorings; i.e., it is bitter and grey or pink. If there is no soaking of the barley, the cooking water has a heavy "branny" flavor which can dominate the flavors of dishes, such as soups, stews, puddings, etc. These characteristics of long preparation time and strong flavor dominance have limited the usefulness of barley as an ingredient in prepared soup mixes and other dishes and as a food alone. Problems such as those discussed above are present with respect to other cereals and other starch products.

Accordingly it is an object of the present invention to produce dry quick-cooking products such as rice and barley, which can be prepared for consumption quickly and which are without limitation as to their usefulness for dry packaged mixes. It is another object to provide such "quick-cooking" products having improved properties of grain separateness and wholeness on cooking for the table. It is another object to provide a pre-cooked cereal in which the grains are non-friable so that loss due to breakage is diminished. It is another object of the present invention to provide such products having improved and uniform attractiveness when cooked for eating. It is a further object to provide products in which the individual grains are resistant to fraying, splitting and breaking during the hydration and final cooking. It is a still further object to provide dry "quick-cooking" rice or barley in which gentleness of mixing or stirring upon reconstitution is not overly critical. Another object is to provide a quick-cooking rice which has the appearance of the original raw rice. Another object is to provide products such as the above which may be prepared in a period of ten minutes which is considered a suitable maximum time for cooking soup mixes. It is another object to provide quick-cooking products which may be dried to low moisture content without hazard to the wholeness of the grain in subsequent preparation and use. It is another object to provide a method of producing such quick-cooking products in which the loss of nutritive solubles and solids yield is materially reduced. It is a still further object to provide a method of manufacturing quick-cooking products which have the various advantages above recited. Other objects and attributes not all available in such quick-cooking products, and not achievable by prior processes will be in part pointed out and in part become apparent as the specification proceeds.

It has been found that the above objects can be attained by hydrating the raw grains by soaking with water, gelatinizing the starch by heating with steam, rinsing and then subjecting the tough gelatinized grains to a transient compression and then drying the grains. Products made according to the above process result in somewhat elongated grains that are hard, dense and non-friable; that resist fraying, splitting and breaking during the hydration and cooking; and that are less sensitive to maceration when being cooked with a quantity of water sufficient for maximum imbibition, and even when over-cooking occurs in soups. Furthermore, there is less loss of the products during preparation; and, the products are not subject to changes, predisposing them toward disintegration in the final preparation for the table, for example, when there is further drying to make them suitable for incorporation in dry soup mixes and the like. These products may be subjected to vigorous water boiling while in suspension as in soups with substantially less destruction to the wholeness and soundness of the grains than heretofore possible with other types of quick-cooking rice products, and this permits reheating of soups and ready use of "left-overs." Similarly, in the kitchen cooking procedure of the grains, fluffing or stirring can be recommended since the grains are much less subject to disintegration than the types heretofore known.

According to the present invention, milled polished rice in clean condition is soaked in water below the gelatinization temperature until it has imbibed all or most of the moisture it needs for uniform gelatinization. Using water at room temperature or even colder, e.g. 65° F., the amount of moisture absorbed does not increase greatly with time after the first fifteen to thirty minutes. For instance, after washing and fifteen minutes' soaking, Patna, a long grain rice, will have a moisture content of approximately 28% which rises slowly thereafter and levels off at 31% to 32% of water after one hour. Similarly, a sample of Zenith, a medium grain rice, imbibed water to a moisture content of 32.5% in 30 minutes and to 34.4% after 60 minutes. Thus a soaking time from 30 to 60 minutes is believed to be entirely satisfactory, although longer times, even overnight, are not deleterious.

It is sometimes desirable in this soaking operation to soak in a solution containing a small amount of citric acid. This tends to inhibit fermentive spoilage and also reduces the later tendency for the product to become rancid. Generally unless rice is specially "hard-brush milled" or washed with detergents or solvents it may contain from .3% to .5% of very unstable rice oil. Accordingly it has often been found desirable to soak the rice in a .025% solution of citric acid. In one test, the various washings to be indicated in the process described herein reduced the original oil content of 0.5% to about .15% and the citric acid to a trace. As an indication of the small amount of residual citric acid, soup broth made from soup mix containing quick-cooking rice not soaked with citric acid showed a pH of 6.44, whereas rice soaked with citric acid produced a broth with a pH of 6.41.

After the initial soaking process the rice is rinsed to wash away loose surface starch which is jelly-like and would tend to cement the grains together, causing caking and lumping during subsequent gelatinization.

The next step in the process is the gelatinization of the rice. This may be advantageously carried out in an autoclave in which the rice is preferably treated with relatively dry steam. Steam condensate or entrainment tends to cause local areas of oversoaked mushy rice grains which would be too soft for the subsequent mechanical compression. It was found that steaming to complete gelatinization can be carried out by pressure cooking the soaked rice in layers 1¾ inches thick at 15 pounds per square inch gauge for 30 minutes. Thinner layers may be gelatinized more quickly, while thicker layers require more time. Similarly, higher pressure steam may be used to reduce the time necessary for gelatinization. It should be noted, however, that with higher pressure steam there may be a tendency for the rice to become slightly darkened in color, and it is preferred to avoid the higher pressures when whiteness of the grains is important.

Completeness of gelatinization may be readily determined by observing when the individual grains have a rubbery character throughout, and there is an absence of white centers within the grains.

At the end of the pressure cooking step it has been found that the individual grains tend to clump together in loose cake form. The gelatinized cake is discharged into wash water and agitated therein which operation detaches the adhering grains and conditions them for the compression treatment. The rice grains at this stage are tough and plastic and rubber-like, and they can be handled rughly without damage thereto.

It appears that there is considerable flexibility in the further processing depending upon variou factors such as the end use for which the product is destined and the particular requirement of the apparatus being used. Thus the rice grains may be removed from this wash step immediately and fed to the compression step, or they may be permitted to soak for a considerable period of time. In the latter case the soaking permits the rice to imbibe more water and thereby imparts to it (after compression and drying) properties which give the final rice product the soft and fluffy texture desired for dishes prepared in the home. For example, rinsing for about one or two minutes at room temperature, results in a moisture content of about 43.5% in the Patna rice as it is fed to the pressure stage. Such rice has been found very suitable for further drying and incorporation in the dry mixes, and for general use in soups, but may be somewhat firm and lacking in fluffiness for other general table uses and in puddings.

By letting the Patna rice soak following pressure cooking for a period of approximately 30 to 60 minutes in cool water, it may be made to imbibe water up to 55% to 60% total moisture content before being passed to the compression operation. The corresponding times and moisture contents for other varieties of rice vary depending upon average grain dimensions and other characteristics. For example, with Zenith, a medium grain rice, a 30 minute soak period before the pressure roller operation has been found to produce between 60% and 65% total moisture. This rinsing or soaking step may take place in cool water although rinsing experimentally at elevated temperatures has also given good results.

When this operation is completed the rice is fed through a compressing operation which compresses and momentarily flattens the individual grains of rice. Commercially this compression step has been performed by passing the grains between a pair of rolls. This step can be performed after a delay of as long as one and a half hours although no delay is necessary, and it is preferred that the delay not exceed approximately thirty minutes. A limiting factor in the time delay is the loss of lubricity due to loss of surface moisture by evaporation or absorption, which tends to cause a slight abrasion of the rice grains as they pass between the rolls. The freshly washed grains, with or without soaking are found to be in excellent condition for this compression roll operation and tend to flow individually from the hopper into the roll aperture without clumping or bridging.

In the compression roll operation, transient compressive forces are applied to the individual grains, and they are squeezed as they pass through an aperture having a dimension which is illustratively one-fourth the minimum thickness of the moist rice grains. However, the rubber-like characteristic of the grains causes each of them to "spring back" immediately after passing through the aperture toward its original shape. After this "spring back" each grain is somewhat thinner, wider and longer than it was before passing to the aperture, but the grains are several times thicker than when passing through the aperture. While sufficient pressure is applied to compact the grains somewhat, excessive pressure that would produce flaking or completely destroy the elasticity or resiliency of the gelatinized grain is to be avoided. It has been found that the gradual application of pressure to the individual grains permits greater compression than is possible with abrupt compression. The selection of wide diameter rolls makes possible the more gradual nipping of the grains and thereby the use of narrower aperture settings, which with narrow diameter rolls would tend to produce limp, battered-looking grains.

While it appears that this compressing may be accomplished in any suitable manner, it has been found that this operation may be accomplished advantageously by the use of a pair of opposed spaced rolls rotated so as to draw the grains in between the rolls on one side and discharge them out the other. Both of the rolls used are of the smooth type, and, although the term "mill" is commonly used to describe this type of apparatus, it is to be understood no actual milling is intended or accomplished. Rolls of a diameter of 11⅜ inches and a length of approximately 12 inches have been used satisfactorily for small-scale production. The rolls have been rotated at a variety of rates depending upon production requirements, but both rolls rotate at the same speed at all times to prevent attrition or flaking actions. The rolls have been spaced apart a distance of from .01 inch to .03 inch depending upon the type of rice being processed. With Patna and Rexora rice a spacing of .017 inch to .018 inch has been found to be satisfactory, and with Zenith rice a roll aperture of .021 inch is satisfactory. It has been found generally that the aperture between the rolls for rice should be of the order of one-quarter to one-third the thickness of the moist pressure-cooked grains. With the above equipment, an average capacity of 535 lbs. of pregelatinized Patna rice has been produced per hour when the rolls rotate at 40 r.p.m. This corresponds to 242 lbs. of rice solids per hour. Rates for barley through-put with the same rolls and conditions are at least as high.

As a result of this mechanical pressing between the rolls the rice grains become slightly less firm and some juices are pressed to the surfaces of the grains. This causes a slight mucilaginous condition at the surface which may cause some tendency toward agglomeration of the grains if drying is carried out directly. It has been found that the separation of the dried grains is facilitated if rice is given a final washing after the pressure stage.

After this final washing, the rice is dried in any convenient manner, apparently without special limitations as to time and temperature. However, the excellent results referred to above were obtained by employing a cabinet dryer with the rice in trays to a density of 0.85 to 1.1 lbs. of rice solids per square foot, and air at a temperature of 175° F. was flowed horizontally over the trays at a rate of 500 feet per minute. A drying time of three to three and one-half hours was found to be entirely satisfactory. This time can be reduced considerably by providing thinner layers and/or higher drying temperatures and/or air flow through the product. Under certain conditions drying temperatures up to 245°

F. were used and the drying time was thirty minutes with no evident fundamental changes in rehydratability or product quality. However, in the same way it was found desirable to limit the pressure of the stream in the pressure cooking step to preserve whiteness of the grain, it is preferable to avoid excessive temperatures in a prolonged drying step.

The final finished rice product according to the present invention has an appearance somewhat longer and more slender than the original polished rice, and upon being hydrated it swells to form a white attractive long grain with little or no suggestion to the unpracticed eye of its having been subjected to mechanical compression. The grains are slightly reduced in one dimension, but they do not approach a flaked condition such as in a flaked cereal food. In fact, the rice product of this invention, though precooked, resembles very closely the original pearly polished rice from which it is derived. They do not appear to be opaque, puffed, porous or fragile. Upon close examination the dry grains of the rice product of the present invention, each grain exhibits thin parallel white lines transverse to the major axis of the grain; and microscopic examination discloses that these striations often are small "vacuoles" or "bubble-like" voids.

The following table sets forth characteristics of the grains of a particular batch of rice processed according to the present invention and then reconstituted as might be done in the home, and compares the kitchen preparation of the quick-cooking product with that of the original rice.

*Characteristics of one specimen of Texas Patna rice grains*

| Stage of Process | Moisture Content, Percent | Average Thickness, Inch | Average Length, Inch |
|---|---|---|---|
| I. Original, Raw Polished Rice | 13.5 | [1] 0.066 | 0.24 |
| II. After pressure cooking | 31.5 | 0.089 | 0.33 |
| III. After washing, following cooking | 43.5 | 0.070 | 0.34 |
| IV. After compression through aperture of 0.017 inch | | 0.061 | 0.37 |
| V. After drying the final Quick-Cooking Rice | 5 to 14 depending upon final use | 0.038 | 0.38 |
| Kitchen Preparation Procedures: | | | |
| A. Cooking raw polished rice as used in stage I above—1 cup of rice was thoroughly washed, added to 1½ cups water, brought to a boil over moderate flame, then cooked at low boil for 20 minutes until tender. Overall time about 30 minutes | 67 | 0.083 | 0.36 |
| B. Preparation of Quick-cooking Rice produced as per stages I to V above—1 cup rice added to 1¼ cups water, brought to a boil rapidly, removed from heat, covered and allowed to stand 10 minutes | 68 | 0.063 | 0.42 |

[1] The rice grains are not uniformly circular at the minor axis. There is a slight natural flattening. These thickness measurements represent the lesser dimension.

This table clearly shows how rice produced by this invention hydrates to an equal degree by a much simpler and shorter procedure than that commonly used in the kitchen with ordinary rice. In addition, when rice prepared according to the present invention is cooked in the home, it provides consistently a pleasing appearance.

Extended cooking or even re-boiling of the rice which has been processed according to the present invention does not cause objectionable disintegration of the grains. The over-all percentage loss of the product during processing and preparation for the table is less with the present invention than with prior known processes, and this reduces the loss of solubles, i.e., minerals, vitamins and sugars, so that the final product has higher nutritional value. In addition to the advantages in the household use of the processed rice product, the process of the present invention affords yield economies in production that were not obtainable heretofore with other known processes for producing quick-cooking rice.

An advantage according to the present invention in the production of quick-cooking rice is that during drying, the final step, it is not necessary to drive off as much water per pound of rice solids as if an immersion cooking process had been employed, such as was done in some of the processing heretofore known. Typical moisture contents of rice processed according to the present invention and ready for drying are between 55% and 60%, whereas in the process of cooking to complete gelatinization by immersion and boiling, the moisture content at a similar stage average between 75% and 80%. Assuming that one pound of the dry product with a 10% moisture content is produced: when the wet product contains 55% moisture, it is necessary to remove one pound of moisture; when the wet product contains 75% moisture, it is necessary to remove 2.6 pounds of moisture. Similar comparisons may be made for other initial and final moisture contents, but in all cases the savings in connection with the present invention are substantial.

A further advantage of the present invention is an increased yield over processes heretofore known. With relatively small-scale operations using the present invention, yields have averaged 92% on a dry solids basis. These relatively high yields are obtained due to the fact that the pressure cooking does not destroy the grain wholeness or dissolve solubles, as does immersion cooking in boiling water. In addition to the other factors, the grains that may be damaged or checked during milling and polishing or during soaking appear to be repaired or cemented during the pressure cooking process.

The final dry rice product produced from Patna rice, as described above, has an appearance which is remarkably like that of the original polished dry rice. The processed product has longer grains and the reduction in thickness is somewhat apparent. However, the coloring and general translucent appearance are substantially the same.

It has been indicated above that the present invention contemplates the processing of other starch-containing products such as other cereals, and particularly barley. The processing of barley has been carried on in a manner similar to the manner described above with respect to rice. The processing of barley involves departures from the above described processing of rice to compensate for the characteristics of barley which are different from those of rice. For example, barley requires longer soaking and cooking periods, but the dry processed product may be prepared for table use in substantially the same manner and time.

It has been found that barley known commercially as Acme 2/0 gives an excellent final product when processed in accordance with the present invention. It is our understanding that this particular barley is produced from Campana rough barley which has been subjected to six pearling operations. Another commercial grade known as No. 3 Chicago barley has been processed and has produced a very satisfactory final product. This barley is also known as "common brown" grade, and was reported to be made by subjecting Campana barley to three pearling operations.

Raw pearled barley is soaked in water for a period of one and one-half to three hours, or it may be soaked longer if the grain size is exceptionally thick or if the commercial operation makes further soaking desirable. When soaked for substantial periods, for example overnight, preferably the water should contain dilute citric acid as discussed above in connection with rice. The soaked barley is rinsed in fresh water to remove the surface material and loosened bran particles. Illustratively, the barley is then processed in the same manner as explained above for rice. With the equipment and processing conditions discussed above for rice, the Acme 2/0 barley was cooked 45 minutes with steam at 15 pounds per square inch gauge, and was completely gelatinized. In this condition the individual barley grains are rubbery and have uniformly translucent character. These individual grains may be squeezed with the fingers so that they are distorted, but will return to the original shape when the squeezing ceases.

The gelatinized barley is discharged into water and agitated slightly to detach the adhering grains. The grains are then subject to the mechanical compression operation by passing them through rotating rolls in the manner described above for rice. If an exceptionally soft and fluffy final table product is desired, the barley may be soaked for a period such as one hour prior to the mechanical compression operation. The aperture between the rolls for the mechanical compression is varied within reasonable limits depending upon the type of barley. However, for Acme 2/0 barley the aperture of 0.014 inch was very satisfactory for kitchen preparations for puddings or other table use. At an aperture setting of 0.015 inch for Acme 2/0 barley the ultimate cooked product was appropriate for dry soup mixes. With No. 3 Chicago barley which has a large grain size, the aperture setting of 0.021 inch produced results comparable to the results obtained with the 0.014 inch setting for Acme 2/0 barley.

During the processing of one particular specimen of barley as described above, the original raw polished barley contained 9.2% moisture. During the washing and soaking operation the moisture content rose to 42.5% and during gelatinization there was an additional rise to a moisture content of 44.5%. At this stage, after the product was rinsed and the mechanical compression applied, the moisture content was 52.9%. The product was then rinsed again and the moisture content was 55.8%. The aperture between the rolls of 0.014 inch was approximately one-eighth the thickness of the individual grains, i.e., 0.114 inch, and the grains "sprang back" to 0.099 inch thickness. In this case the barley was dried to a moisture content of 10%. The dried barley grains were found to have large central voids mostly open through at least one thin wall. Most of the grains had crevices extending into and through the thicker walls. In this major respect, barley processed according to the present invention differs from similarly processed rice. When the barley is reconstituted and further cooked (i.e., prepared for table use), the voids and crevices appear to permit the entry of water and promote rapid hydration. These voids do not appear in the original raw grains, but they appear first after gelatinization.

In processing products in accordance with the present invention the gelatinization is completed during the steam cooking operation, but no free water is present and the product does not imbibe sufficient water to make it edible and palatable. Other known pre-cooking processes involve the absorption of substantially more water by the products prior to drying. As discussed above, the limited absorption of water reduces the tendency for solubles to leach out. At the same time, with barley objectionable flavoring and coloring components of the crease bran are removed prior to the final cooking. Hence, the final barley product has most of the desirable constituents of the original barley, but the undesirable constituents have been largely removed. Barley or rice prepared as above may be prepared for the table or in soup in ten minutes; as indicated above, this is the maximum time which is generally accepted for the preparation of dry soup mixes.

While there are given above certain specific examples of this invention and its application in practical use and also certain modifications and alternatives, it should be understood that these are not intended to be exhaustive or to be limiting of the invention. On the contrary, these illustrations and the explanations herein are given in order to acquaint others skilled in the art with this invention and the principles thereof and a suitable manner of its application in practical use, so that others skilled in the art may be enabled to modify the invention and to adapt and apply it in numerous forms, each as may be best suited to the requirement of a particular use. It will be evident further that the various steps of the procedure may be performed with any known apparatus suitable to the particular operating conditions to enable adjustment of the times and temperatures of soaking, cooking, compression, and similar factors according to the principles set forth above to obtain the desired quick-cooking products. The method may also be applied to other desired varieties of cereals and other starch products without departing from the spirit and scope of the present invention.

What is claimed is:

1. The method of processing raw grains of rice to form a quick-cooking product which comprises, soaking milled and polished raw rice grains in water at a temperature less than that which would cause gelatinization, pressure cooking said soaked grains by subjecting them to steam at an elevated pressure until there is substantially complete gelatinization thereof, discharging the cooked grains into a body of water and agitating the cooked grains in said body of water to separate them into discrete grains, compressing said discrete grains momentarily to between about one-third and one-fourth of their thickness washing said grains to remove any exuded juices, and drying said grains to a moisture content between about 5% and 14% in an atmosphere having a temperature less than that which will cause darkening of the grains.

2. The method of processing raw grains of rice to form a quick-cooking product which comprises, soaking milled and polished raw rice grains in water for at least 15 minutes at a temperature less than that which would cause gelatinization, pressure cooking said soaked grains by subjecting them to steam at an elevated pressure of about 15 pounds per square inch gauge for approximately thirty minutes until there is substantially complete gelatinization thereof, discharging the cooked grains into a body of water and agitating the cooked grains in said body of water to separate them into discrete grains, subjecting said discrete grains to transient compressive forces by passing them between a pair of rolls spaced apart a distance between about 0.01 and 0.03 inch, washing said grains to remove any exuded juices, and drying said grains to a moisture content between about 5% and 14% in an atmosphere having a temperature less than that which will cause darkening of the grains.

3. The method of processing rice to form a quick-cooking produce which comprises, soaking milled and polished raw rice grains in water at substantially room temperature until the grains attain a moisture content of approximately 30%, removing the grains from said soaking water, pressure cooking said grains at an elevated temperature for a period sufficient to produce substantially complete gelatinization of the grains, discharging said grains into a body of water and agitating them therein to separate the grains and increase their moisture content to between about 43.5% and 65%, momentarily compressing said grains to between about one-fourth and one-third of their thickness, and drying said grains to a moisture content of between about 5% and 14%.

4. The method as described in claim 3 wherein said separated grains are soaked for a period of approximately thirty to sixty minutes prior to compressing them to increase the moisture content of said grains.

5. The method of producing quick-cooking rice which comprises, soaking raw rice grains in water at a temperature below which gelatinization occurs for a period to produce absorption of substantially enough water for complete gelatinization, pressure cooking said grains with dry steam until complete gelatinization occurs, discharging the pressure-cooked grains into a body of water and agitating them therein to lubricate them and separate them, passing the lubricated grains between a pair of rollers having a diameter of approximately twelve inches and spaced apart about 0.014 to 0.021 inch, and drying said grains to a moisture content of approximately 5% to 14%.

References Cited in the file of this patent

UNITED STATES PATENTS

| | | |
|---|---|---|
| 400,835 | Donelson | Apr. 2, 1889 |
| 1,832,813 | Luke | Nov. 17, 1931 |
| 1,925,267 | McKay | Sept. 5, 1933 |
| 2,064,701 | Stokkebye | Dec. 15, 1936 |
| 2,438,939 | Ozai-Durrani | Apr. 6, 1948 |
| 2,733,147 | Ozai-Durrani | Jan. 31, 1956 |

FOREIGN PATENTS

| | | |
|---|---|---|
| 657,691 | Great Britain | Sept. 26, 1951 |